Patented Jan. 2, 1951

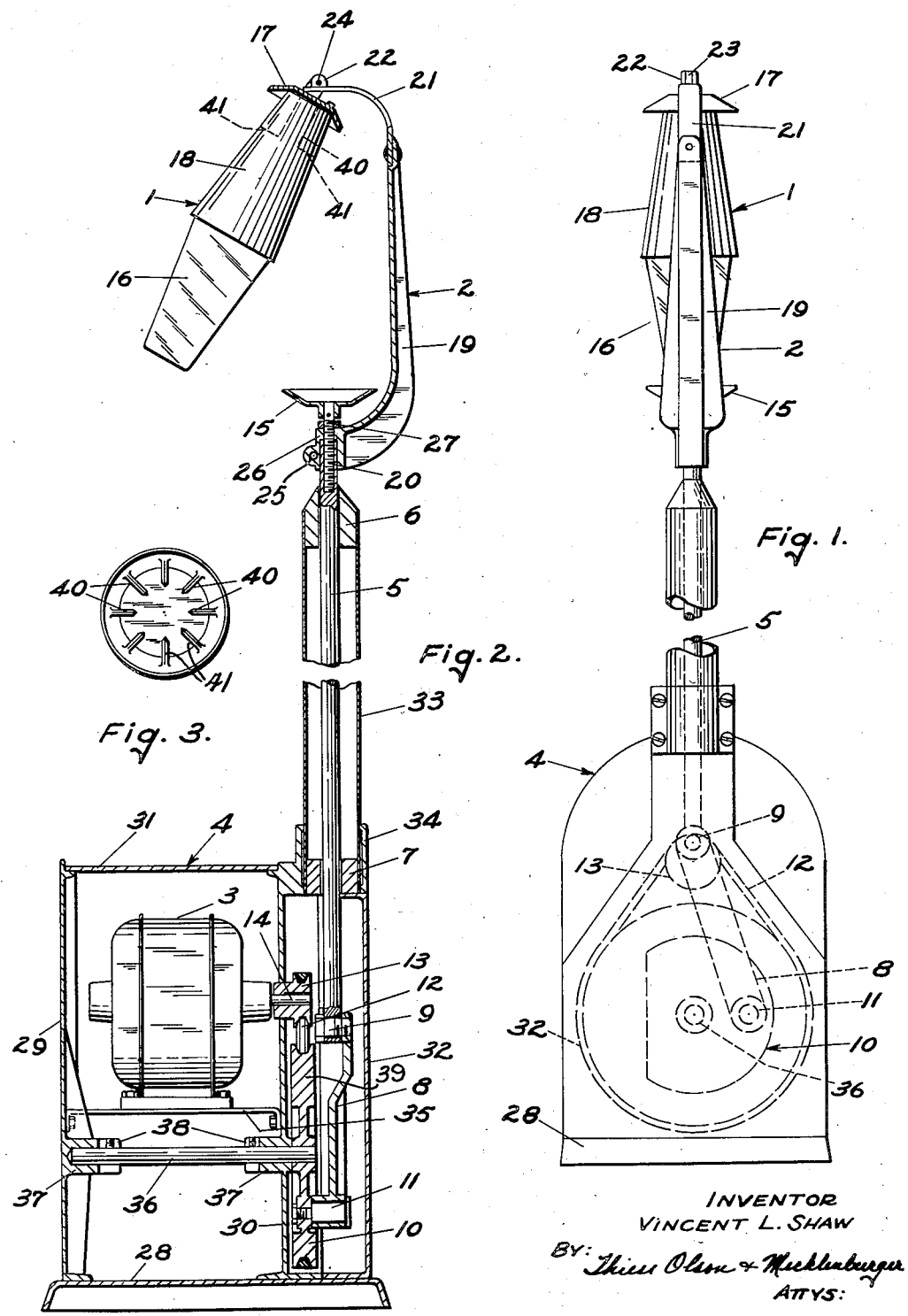

2,536,959

UNITED STATES PATENT OFFICE 2,536,959

DRINK MIXER

Vincent L. Shaw, Evanston, Ill.

Application July 18, 1946, Serial No. 684,505

4 Claims. (Cl. 259—91)

My invention relates to drink mixers.

One of the objects of my invention is to provide a drink mixer having a base for resting on the floor, a container holder mounted for up and down movement on the base, an electric motor for operating the container holder, and a transmission from the motor to the holder designed so that the center of gravity of the motor and transmission will be relatively close to the floor to minimize the danger of upsetting the device.

A further object is to provide a drink mixer comprising two cup-like members to be placed together to form an enclosure to be shaken up and down and in which one of the cup-like members is provided with ice-cutting blades for cutting up chunks of ice placed in the container.

Further objects will appear from the description and claims.

In the drawings, in which an embodiment of my invention is shown:

Fig. 1 is a front elevational view of my improved drink mixer;

Fig. 2 is an axial vertical section thereof; and

Fig. 3 is a top view of the cup-like cover forming part of the container.

Referring to the drawings in detail, the construction shown comprises a two-part container 1 into which the ingredients for the drink are placed, a container holder 2 mounted for up and down movement, an electric motor 3, transmission from the motor to the container holder, and a housing 4 for the motor and transmission.

The transmission from the motor to the container holder comprises a slide rod 5 mounted for up and down movement in upper and lower guides 6 and 7, a connecting rod 8 pivotally secured at its upper end at 9 to the lower end of the slide rod 5, a combination crank and pulley 10 having a crank pin 11 to which the lower end of the connecting rod 8 is secured, a V-belt 12 running over the pulley 10, and a small pulley 13 mounted on the motor shaft 14 over which the upper portion of the V-belt runs.

The container holder comprises a lower dished clamp or cup 15 in which the lower end of the glass 16 is to seat, an upper dished clamp 17 in which the upper end of the container cover 18 seats, a clamp bracket 19 into which the threaded stem 20 of the lower cup member 15 is screwed, and a spring bracket 21 secured to the upper end of the bracket 19 having lugs 22 extending upwardly therefrom to which the upwardly extending lug 23 on the upper seat is pivoted at 24.

The bracket 19 may be clamped to the upper end of the slide rod 5 by means of a clamping screw 25 which draws together the split portions of the sleeve 26 of the bracket which extends over the upper end of the slide 5. The lower container seat may be secured in any desired adjusted position by means of a lock nut 27.

The motor and a large part of the transmission may be housed in a suitable housing 4 comprising a base portion 28 which rests on the floor, an end frame 29 secured to this base portion at one end thereof, a second end frame 30 secured to the base adjacent the other end thereof, a U-shaped cover 31 extending between the end frames 29 and 30 and detachably secured thereto, and an end cover 32 between which and the end frame 30 the pulleys 10 and 13 and connecting rod 8 are housed. The upper and lower guides 6 and 7 for the slide rod 5 are mounted in a tubular post 33 the lower end of which fits inside of a sleeve-like extension 34 on the end frame 30.

The motor 3 may be mounted on a shelf 35 detachably secured to the end frames 29 and 30. The crank shaft 36 on which the combination pulley and crank 10 is mounted may be rotatably mounted in bearings 37 on the end frames 29 and 30. Suitable collars 38 may be secured to the crank shaft 36 engaging the bearing portions 37 for holding the crank shaft against endwise movement. The combination pulley and crank 10 may be counterweighted at 39 in order to counteract the momentum due to the connection between the crank pin 11 and connecting rod 8. If desired, suitable time controlled means (not shown) may be provided which will automatically stop the shaking or mixing action of the mixer at the end of a predetermined period.

In order to cut up or finely divide pieces of ice which may be placed in the container, the cover 18 may be provided with a series of blades 40 circumferentially spaced and lying in radial planes as shown in Fig. 3. These blades may be provided with cutting edges 41, particularly the edges facing the receptacle 16. As the container holder is shaken up and down, the pieces of ice will be thrown against the sharp end edges of the blades 40 and broken and cut into small pieces.

A motor may be selected and a transmission so designed that the container 1 will be shaken up and down about 340 times per minute.

By the use of this apparatus, the attendant at the bar is enabled to mix a great many more drinks than he would be able to mix by hand. He can fill the container and place it in the shaker, place the shaker in operation and then leave the machine to take care of the mixing operation while he busies himself with something else. If a time cut-off is used, the shaker will stop operation at the end of the time at which it is set, for example, a minute and a half. The design is such that the weight of the motor and transmission is close to the base, thus providing a low center of gravity which lessens the danger of the apparatus being upset. In view of the relatively high speed of the machine, it is important and necessary that it should set on the floor rather than on a counter or bar. At the speed required, if the machine were placed on a counter or bar, the vibration would render it impractical due to the breakage of glassware, bottles, etc. This necessity for placing the machine on the floor makes it imperative that the center of gravity of the machine be as low as possible.

Further modifications will be apparent to those skilled in the art and it is desired, therefore, that the invention be limited only by the scope of the appended claims.

Having thus described my invention, what I claim and desire to secure by Letters Patent is:

1. A device for mixing drinks or the like comprising a base for resting on the floor, a container holder mounted for up-and-down movement on said base for supporting the container at a convenient height for a standing attendant, an electric motor, transmission from said motor to said holder, and a housing for said motor and transmission mounted on said base, said transmission comprising a horizontal crankshaft underneath said motor extending parallel to the motor shaft, a crank on said crankshaft, transmission between said shafts, and a connecting rod between said crank and holder, said housing comprising two end frames, a sub-base extending between said end frames underneath said motor and above said crankshaft on which said motor is mounted, a detachable cover bridging the space between said end frames and covering said motor, and a detachable end cover between which and one of said end frames the crank, transmission, and connecting rod are housed, said end cover having an extent to selectively cover or expose the connecting rod and the transmission between the shafts.

2. A device for mixing drinks or the like comprising a base for resting on the floor, a container holder mounted for up-and-down movement on said base for supporting the container at a convenient height for a standing attendant, an electric motor, transmission from said motor to said holder, and a housing for said motor and transmission mounted on said base, said transmission comprising a horizontal crankshaft underneath said motor extending parallel to the motor shaft, a crank on said crankshaft, transmission between said shafts, and a connecting rod between said crank and holder, said housing comprising two end frames, a sub-base extending between said end frames underneath said motor and above said crankshaft on which said motor is mounted, a detachable cover bridging the space between said end frames and covering said motor, and a detachable end cover between which and one of said end frames the crank, transmission, and connecting rod are housed, one of said end frames being provided with a bearing for said crankshaft, said end cover having an extent to selectively cover or expose the connecting rod and the transmission between the shafts.

3. A device for mixing drinks or the like comprising a base for resting on the floor, a container holder mounted for up-and-down movement on said base for supporting the container at a convenient height for a standing attendant, an electric motor, transmission from said motor to said holder, and a housing for said motor and transmission mounted on said base, said transmission comprising a horizontal crankshaft underneath said motor extending parallel to the motor shaft, a crank on said crankshaft, transmission between said shafts, and a connecting rod between said crank and holder, said housing comprising two end frames, a sub-base extending between said end frames underneath said motor and above said crankshaft on which said motor is mounted, a detachable cover bridging the space between said end frames and covering said motor, and a detachable end cover between which and one of said end frames the crank, transmission, and connecting rod are housed, each of said end frames being provided with a bearing for said crankshaft, said end cover having an extent to selectively cover or expose the connecting rod and the transmission between the shafts.

4. A device for mixing drinks or the like comprising a container holder mounted for up-and-down movement including a vertically reciprocable slide and a container clamp mounted on said slide comprising a concave seat for receiving one end of a receptacle, an opposed concave seat for receiving the end of an opposed complemental covering receptacle, one of said concave seats being rockably mounted to move about an axis extending transversely through a cylinder extending through the peripheries of the concave seats when in clamped positions, and spring means acting between said concave seats urging them toward each other.

VINCENT L. SHAW.

REFERENCES CITED

The following references are of record in the file of this patent:

UNITED STATES PATENTS

| Number | Name | Date |
|---|---|---|
| 416,636 | Meyers | Dec. 3, 1889 |
| 985,040 | Lilienthal | Feb. 21, 1911 |
| 1,134,354 | Seifke | Apr. 6, 1915 |
| 1,713,979 | Redmond | May 21, 1929 |
| 2,029,234 | Helmes | Jan. 28, 1936 |
| 2,146,860 | Shaw | Feb. 14, 1939 |